United States Patent
Ahn et al.

(10) Patent No.: US 8,265,720 B2
(45) Date of Patent: Sep. 11, 2012

(54) SLIDING DEVICE FOR CELLULAR PHONE

(75) Inventors: Sung-Sang Ahn, Seoul (KR); Ju-Young Yun, Gyeonggi-do (KR)

(73) Assignee: Diabell Co., Ltd., Anyang (KR)

( * ) Notice: Subject to any disclaimer, the term of this patent is extended or adjusted under 35 U.S.C. 154(b) by 747 days.

(21) Appl. No.: 12/298,990

(22) PCT Filed: May 23, 2007

(86) PCT No.: PCT/KR2007/002491
§ 371 (c)(1),
(2), (4) Date: Apr. 15, 2009

(87) PCT Pub. No.: WO2007/136224
PCT Pub. Date: Nov. 29, 2007

(65) Prior Publication Data
US 2010/0154168 A1 Jun. 24, 2010

(30) Foreign Application Priority Data

May 24, 2006 (KR) .......................... 10-2006-0046450
Feb. 21, 2007 (KR) .......................... 10-2007-0017612

(51) Int. Cl.
*H04M 1/00* (2006.01)
(52) U.S. Cl. ................................................... 455/575.4
(58) Field of Classification Search .................. 16/255, 16/256, 257, 277, 282, 283, 285, 287, 295, 16/302, 385; 361/679.39, 755, 814; 455/575.4
See application file for complete search history.

(56) References Cited

U.S. PATENT DOCUMENTS

| 7,157,648 | B2 * | 1/2007 | Park ................................ 174/481 |
| 7,548,769 | B2 * | 6/2009 | Lee et al. ...................... 455/575.1 |
| 7,774,033 | B2 * | 8/2010 | Lee ............................... 455/575.4 |
| 7,885,055 | B2 * | 2/2011 | Park et al. .................... 361/679.01 |
| 7,953,465 | B2 * | 5/2011 | Jeong et al. ................. 455/575.4 |
| 7,966,049 | B2 * | 6/2011 | Jang ............................. 455/575.4 |
| 8,023,257 | B2 * | 9/2011 | Hsu et al. ................... 361/679.3 |
| 8,041,407 | B2 * | 10/2011 | Wakihara .................... 455/575.4 |
| 2006/0258413 | A1 * | 11/2006 | Park ............................. 455/575.4 |
| 2007/0218963 | A1 * | 9/2007 | Kim ............................. 455/575.4 |
| 2008/0058039 | A1 * | 3/2008 | Lee et al. .................... 455/575.4 |
| 2008/0254844 | A1 * | 10/2008 | Lee ............................. 455/575.4 |

* cited by examiner

*Primary Examiner* — Victor Batson
*Assistant Examiner* — Roberta Delisle
(74) *Attorney, Agent, or Firm* — LRK Patent Law Firm

(57) ABSTRACT

Disclosed herein is a hinge device for a cellular phone, which has no device housing and thus, can achieve a greater slimness of the cellular phone and reduce the generation of a noise during a sliding operation of a slide body included in the cellular phone. The hinge device includes a first push rod connected to a main body of the cellular phone and having a pin and a pin hole, and a second push rod connected to a slide body of the cellular phone and having a pin and a pin hole. The pin of the first push rod is penetrated through the pin hole of the second push rod, and the pin of the second push rod is penetrated through the pin hole of the first push rod. A spring is provided around each pin.

5 Claims, 4 Drawing Sheets

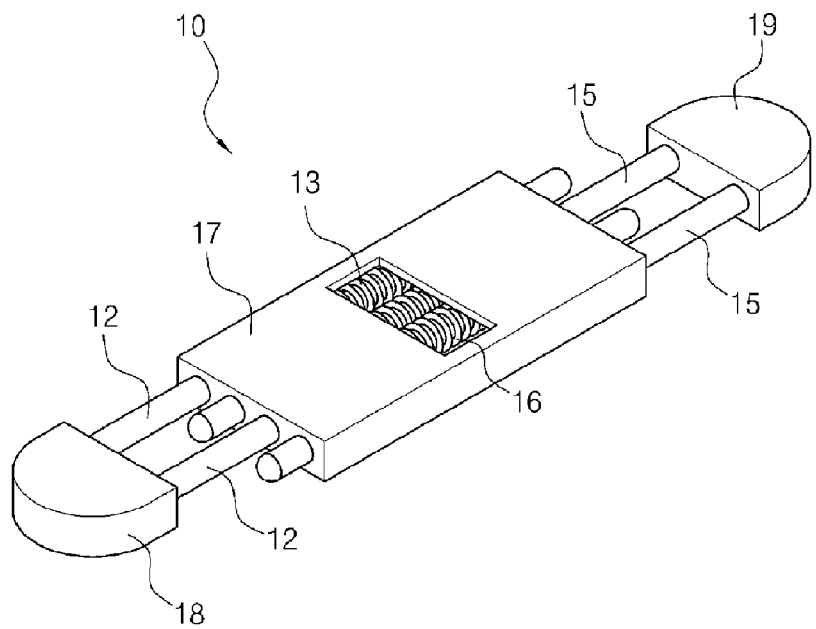
[Fig. 1]
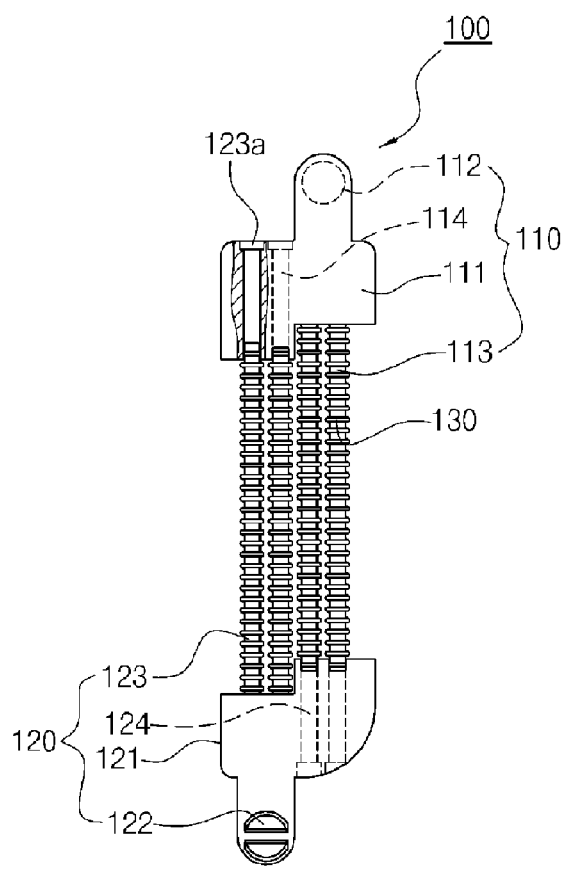
[Fig. 2]

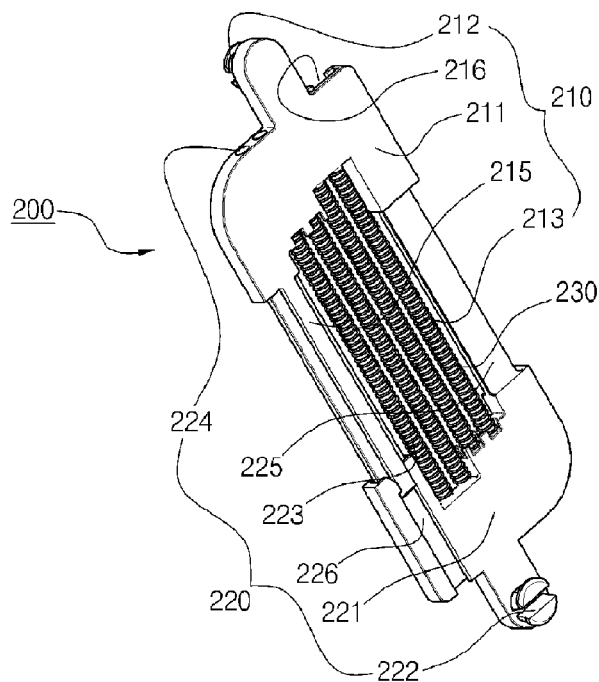
[Fig. 3]
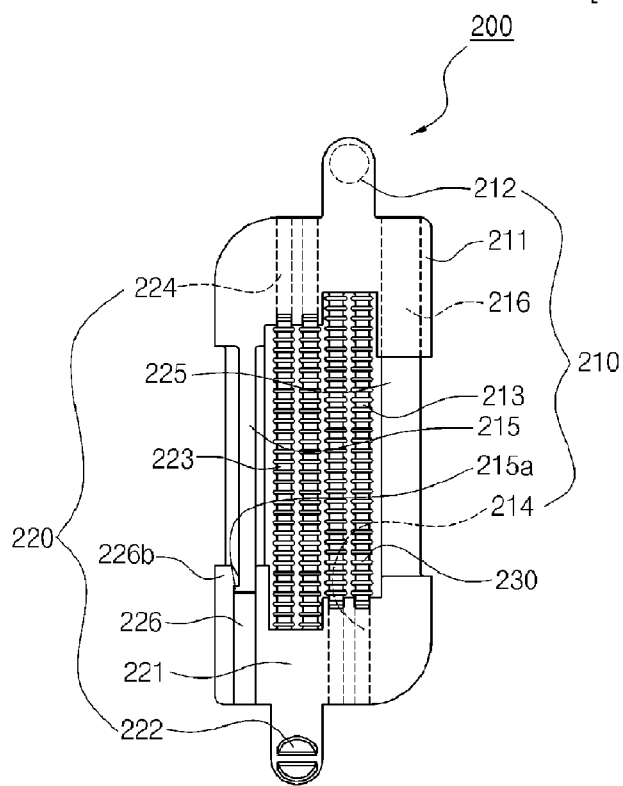
[Fig. 4]

[Fig. 5]
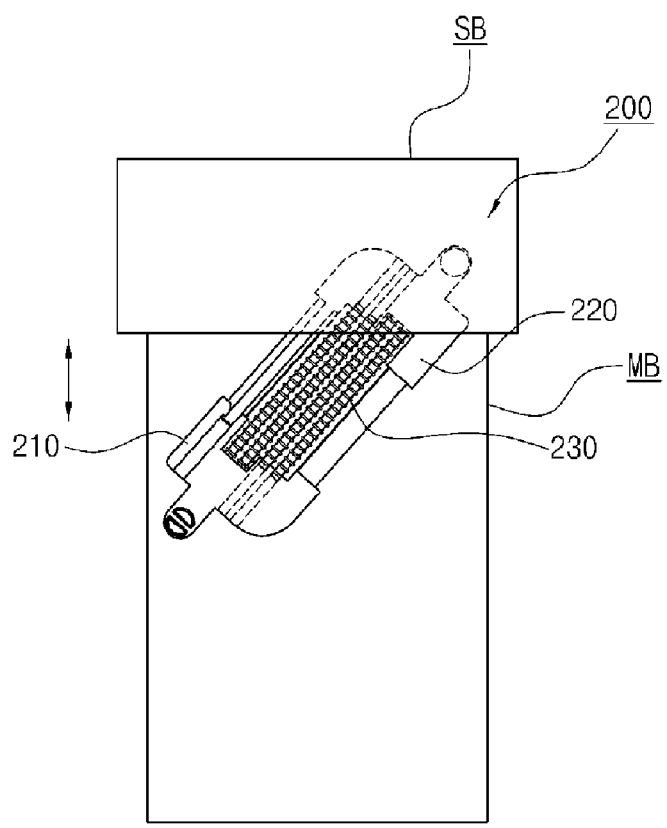
[Fig. 6]
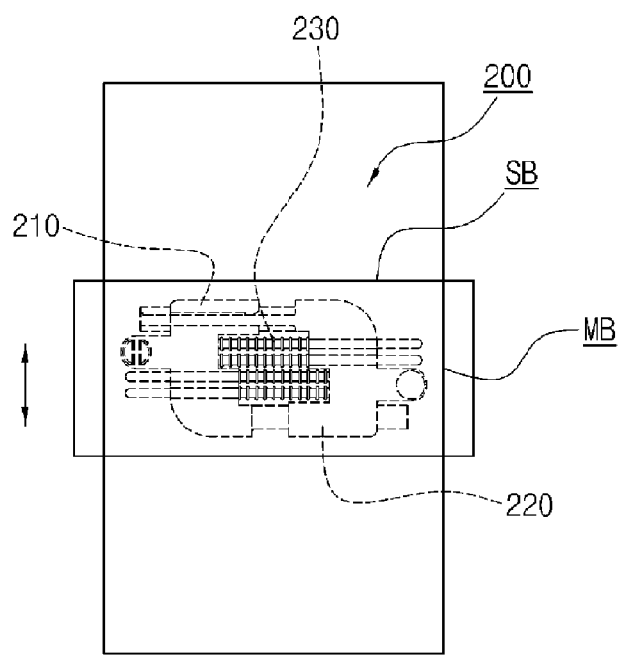

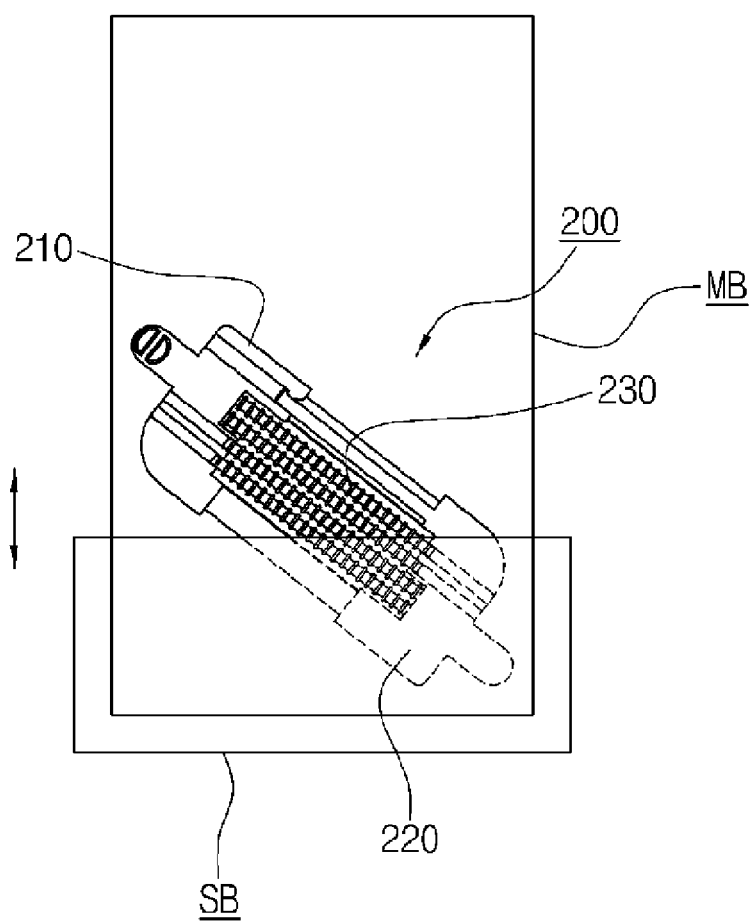
[Fig. 7]

SLIDING DEVICE FOR CELLULAR PHONE

TECHNICAL FIELD

The present invention relates to a hinge device for a cellular phone, and more particularly, to a hinge device for a cellular phone, which has no need for a separate device housing and thus, can achieve a greater slimness of the cellular phones, and reduce the generation of a noise during a sliding operation of a slide body included in the cellular phone.

BACKGROUND ART

Portable wireless terminals have been developed from bar-type terminals to flip-type terminals, flip-up type terminals, etc. Recently, folder-type terminals and slide-type terminals have become the main style of portable wireless terminals. Of these various terminals, slide-type terminals have an opening operating structure in which a slide body having a display window is sliding-moved on a main body having a keypad, so as to be moved away from or toward the main body. With this configuration, in addition to providing the slide-type terminals with a display screen having a size similar to that of a folder-type terminal, the overall size of the slide-type terminal can be reduced. For this reason, nowadays, the slide-type terminals are preferred as high-grade products.

There have been conducted various researches and developments for a hinge device capable of facilitating easy opening/closing operations of slide-type portable wireless terminals.

Hereinafter, as one example of the prior art, a hinge device disclosed in Korean Utility Model Registration No. 362198 will be described in brief. Referring to FIG. 1, the hinge device 10 of the prior art includes a first cap 18 to be connected to a main body (not shown), a rod 12 extended from the first cap 18, a second cap 19 to be connected to a slide body (not shown) of a slide-type terminal, and a rod 15 extended from the second cap 19. The rod 12 provided at the first cap 18 is arranged alternately with the rod 15 provided at the second cap 19.

The hinge device 10 further includes a housing 17, through which a pair of the rods 12 and 15 are penetrated. The housing 17 guides the pair of the rods 12 and 15 such that the rods 12 and 15 are protruded out of the housing 17 in opposite directions from each other. A spring 13 is inserted in the housing 17, to elastically support the rods 12 and 15 penetrated through the housing 17.

In the prior art hinge device 10 having the above described configuration, if the slide body (not shown) is moved downward upon receiving an external force, the rods are moved to be further penetrated through the housing, thus causing the spring to be compressed and the first cap and the second cap to be moved close to each other. In such a state, if the slide body is further moved downward slightly upon receiving an external force, the succeeding downward movement of the slide body can be naturally accomplished by an elastic restoration force of the spring even if the external force is no longer applied.

However, the above described prior art hinge device has a limit to achieve a reduction in thickness because it has a need for the housing that is used to receive the spring and to guide the rods. Consequently, a portable wireless terminal employing the hinge device has a limit in slimness.

Moreover, as the spring is compressed in the course that the rods are moved to be further penetrated through the housing, there may occur a frictional noise between the housing and the spring.

DISCLOSURE OF INVENTION

Technical Problem

The present invention has been made in view of the above mentioned problems, and an aspect of the present invention is to provide a hinge device for a cellular phone, which has no need for a separate device housing and thus, can achieve a greater slimness of the cellular phone, and reduce the generation of a noise during a sliding operation of a slide body included in the cellular phone.

Technical Solution

In accordance with an aspect of the present invention, there is provided a hinge device for a cellular phone comprising: a first push rod connected to a main body of the cellular phone and having a pin and a pin hole; and a second push rod connected to a slide body of the cellular phone and having a pin and a pin hole, wherein the pin of the first push rod is penetrated through the pin hole of the second push rod, and the pin of the second push rod is penetrated through the pin hole of the first push rod, and wherein a spring is provided between the first push rod and the second push rod.

The first push rod and the second push rod have to be configured so as not to be separated from each other. For this, at least one of the pins may have a stopper formed on an end thereof. Although the pins are moved while passing through the pin holes so as to allow the first push rod and the second push rod to be moved away from or toward each other, the stopper formed at the end of the pin cannot pass through the associated pin hole. Accordingly, the pin cannot be completely separated from the pin hole.

Alternatively, one of the first push rod and the second push rod may have a guide portion, and the other push rod may have a guide bar, the guide bar being configured to be penetrated through the guide portion and having a stopper formed at an end thereof. In this case, the same effect as the above description can be accomplished.

The guide bar and the guide portion are provided at each of the first push rod and the second push rod, and the guide bar formed at the first push rod is penetrated through the guide portion formed in the second push rod. As a result, it is possible to prevent the first push rod and the second push rod from being separated from each other with a higher stability.

Each pin may be integrally formed with the first push rod or the second push rod.

Each pin may be formed separately from the first push rod or the second push rod, and be inserted into and coupled to the first push rod or the second push rod. In this case, preferably, the first push rod and the second push rod are made of a synthetic resin material, and the pin is made of a metal material.

BRIEF DESCRIPTION OF THE DRAWINGS

The above aspect, and other features and advantages of the exemplary embodiments of the present invention will become more apparent after reading the following detailed description when taken in conjunction with the drawings, in which:

FIG. 1 is a perspective view illustrating a hinge device for a cellular phone in accordance with the prior art;

FIG. 2 is a view illustrating a hinge device in accordance with a first embodiment of the present invention;

FIGS. 3 and 4 are views illustrating a hinge device in accordance with a second embodiment of the present invention; and FIGS. 5 to 7 are views illustrating the operation of the hinge device in accordance with the second embodiment of the present invention.

BEST MODE FOR CARRYING OUT THE INVENTION

Exemplary embodiments of the present invention will now be described in detail with reference to the annexed drawings.

FIG. 2 is a view illustrating a hinge device 100 in accordance with a first embodiment of the present invention. Referring to FIG. 2, the hinge device 100 for a cellular phone in accordance with the present invention includes a pair of push rods 110 and 120, and springs 130.

The pair of push rods 110 and 120 have the same configuration as each other in the view of the fact that each push rod 110 or 120 includes a body 111 or 121, a plurality of pins 113 or 123, and pin holes 114 or 124. A difference between the push rods 110 and 120 is that any one of the push rods is a first push rod 110 having a connecting portion 112 to be connected to a main body (not shown) of a cellular phone, and the other one is a second push rod 120 having a connecting portion 122 to be connected to a slide body (not shown) of the cellular phone.

Considering the coupling structure of the first and second push rods 110 and 120, the first push rod 110 and the second push rod 120 are arranged to face each other, and the pins 113, formed at the first push rod 110, are penetrated through the pin holes 124 formed in the second push rod 120. Similarly, the pins 123, formed at the second push rod 120, are penetrated through the pin holes 114 formed in the first push rod 110.

Although the pins 113 and 123 are mounted at the first and second push rods 110 and 120 so as to be penetrated through the pin holes 124 and 114, in order to prevent the pins 113 and 123 from being completely separated from the pin holes 124 and 114, each of the pins 113 and 123 is formed, at an end thereof, with a stopper 123a. The stopper 123a may have any shape or size so long as the stopper 123a cannot pass through the associated pin hole 114 or 124. In this case, the pin hole 114 or 124 may be formed, at an end thereof corresponding to the stopper 123a, with a stepped portion for preventing the passage of the stopper 123a through the pin hole 114 or 124.

The springs 130 are interposed between the first push rod 110 and the second push rod 120. In particular, the springs 130 are preferably provided around the respective pins 113 and 123.

FIGS. 3 to 7 illustrate a hinge device 200 in accordance with a second embodiment of the present invention.

Referring to FIGS. 3 and 4, the hinge device 200 of the present embodiment includes a first push rod 210, a second push rod 220, guide portions 216 and 226 formed at the respective push rods 210 and 220, and guide bars 225 and 215 penetrated through the respective guide portions 216 and 226. Specifically, the guide bar 215 of the first push rod 210 is penetrated through the guide portion 226 of the second push rod 220, and the guide bar 225 of the second push rod 220 is penetrated through the guide portion 216 of the first push rod 210. Of course, to prevent the guide bars 215 and 225 from being completely separated from the guide portions 226 and 216, each of the guide bars 215 and 225 is formed at an end thereof with a stopper 215a, and each of the guide portions 216 and 226 is formed with a stepped portion 226b. The reason for providing the guide bars 215 and 225 and the guide portions 216 and 226 with the above described configuration is to prevent the first push rod 210 and the second push rod 220 from being completely separated from each other while allowing the first and second push rods 210 and 220 to be moved away from or toward each other. That is to say, the guide bars 215 and 225 and the guide portions 216 and 226 have the same operation as that of the stoppers 123a, formed at the ends of the pins, and the pin holes included in the hinge device 100 of the previously described first embodiment.

Except for the above description, other configurations of the hinge device 200 of the second embodiment are identical to those of the hinge device 100 of the previously described first embodiment. That is, each push rod 210 or 220 is configured such that a body 211 or 221 thereof has pins 213 or 223 and pin holes 214 or 224. Also, both the push rods 210 and 220 are arranged to face each other such that the pins 213 or 223 of any one of the push rods are penetrated through the pin holes 224 or 214 of the other push rod. Springs 230 are interposed between both the push rods 210 and 220.

Since the hinge device 200 of the second embodiment includes the guide bars 215 and 225 and the guide portions 216 and 226, there is no need for providing the stopper 123a at the end of each pin as described in the previously described first embodiment.

Hereinafter, the operation of the hinge device in accordance with the second embodiment of the present invention will be described with reference to FIGS. 5 to 7.

As shown in FIG. 5, one side of the first push rod 210 is connected to a main body MB of a cellular phone, and one side of the second push rod 220 is connected to a slide body SB of the cellular phone.

If the slide body SB is moved downward upon receiving an external force, as shown in FIG. 6, the pins are moved so as to be further penetrated through the pin holes, respectively, thereby allowing the first push rod 210 and the second push rod 220 to be moved close to each other. In this case, the springs 230, installed around the respective pins, are compressed by the first and second push rods 210 and 220.

Then, if the slide body SB is further moved downward upon receiving an external force, as shown in FIG. 7, the compressed springs 230 are elastically restored, thereby acting to push the first push rod 210 and the second push rod 220 in opposite directions. With the elastic restoration force of the springs 230, the succeeding downward movement of the slide body SB can be naturally accomplished even if the external force is no longer applied to the slide body SB.

Although the exemplary embodiments of the invention have been disclosed for illustrative purposes, those skilled in the art will appreciate that various modifications, additions and substitutions are possible, without departing from the scope and sprit of the invention as disclosed in the accompanying drawings.

Industrial Applicability

As apparent from the above description, the present invention provides a hinge device for a cellular phone, which has no need for a separate device housing, thereby achieving a greater slimness of the cellular phone and reducing the generation of a noise during a sliding operation of a slide body included in the cellular phone.

The invention claimed is:

1. A sliding device for a cellular phone, comprising:
   a first push rod connected to a main body of a cellular phone and having a pin and a pin hole; and
   a second push rod connected to a slide body of the cellular phone and having a pin and a pin hole,
   wherein the pin of the first push rod is penetrated through the pin hole of the second push rod, and the pin of the second push rod is penetrated through the pin hole of the first push rod, wherein a spring is provided between the first push rod and the second push rod and is exposed to both the main body and the slide body to reduce a thickness of the hinge device, and wherein, to prevent the first push rod and the second push rod from being separated from each other, one of the first push rod and the second push rod has a guide portion, and the other push rod has a guide bar, the guide bar being configured to be penetrated through the guide portion and having a stopper formed at an end thereof.

2. The sliding device according to claim 1, wherein:

the guide bar and the guide portion are provided at each of the first push rod and the second push rod; and the guide bar formed at the first push rod is penetrated through the guide portion formed in the second push rod.

3. A sliding device for a cellular phone, comprising:

a first push rod connected to a main body of a cellular phone and having a pin and a pin hole; and a second push rod connected to a slide body of the cellular phone and having a pin and a pin hole, wherein the pin of the first push rod is penetrated through the pin hole of the second push rod, and the pin of the second push rod is penetrated through the pin hole of the first push rod, wherein a spring is provided between the first push rod and the second push rod and is exposed to both the main body and the slide body to reduce a thickness of the hinge device, and wherein each pin is integrally formed with the first push rod or the second push rod.

4. A sliding device for a cellular phone, comprising:

a first push rod connected to a main body of a cellular phone and having a pin and a pin hole; and a second push rod connected to a slide body of the cellular phone and having a pin and a pin hole, wherein the pin of the first push rod is penetrated through the pin hole of the second push rod, and the pin of the second push rod is penetrated through the pin hole of the first push rod, wherein a spring is provided between the first push rod and the second push rod and is exposed to both the main body and the slide body to reduce a thickness of the hinge device, and wherein each pin is formed separately from the first push rod or the second push rod, and is inserted into and coupled to the first push rod or the second push rod.

5. The sliding device according to claim 4, wherein the first push rod and the second push rod are made of a synthetic resin material, and the pin is made of a metal material.

* * * * *